United States Patent
Volta et al.

(10) Patent No.: US 10,176,351 B2
(45) Date of Patent: Jan. 8, 2019

(54) STAND TO HOLD AND CHARGE A MOBILE MACHINE-READABLE SYMBOL READER

(71) Applicant: Datalogic IP Tech, S.r.l., Bologna (IT)

(72) Inventors: Romano Volta, Bologna (IT); Giuseppe Di Bari, Bologna (IT); Marco Insero, Bologna (IT)

(73) Assignee: DATALOGIC IP TECH, S.R.L., Bologna (IT)

( * ) Notice: Subject to any disclaimer, the term of this patent is extended or adjusted under 35 U.S.C. 154(b) by 0 days.

(21) Appl. No.: 15/471,939

(22) Filed: Mar. 28, 2017

(65) Prior Publication Data

US 2018/0285613 A1    Oct. 4, 2018

(51) Int. Cl.
*G06K 19/00* (2006.01)
*G06K 7/10* (2006.01)
*G06K 19/06* (2006.01)
*G06K 7/14* (2006.01)

(52) U.S. Cl.
CPC ....... *G06K 7/10881* (2013.01); *G06K 7/1408* (2013.01); *G06K 19/06009* (2013.01)

(58) Field of Classification Search
USPC ................. 235/435, 439, 454, 462
See application file for complete search history.

(56) References Cited

U.S. PATENT DOCUMENTS

| | | |
|---|---|---|
| 5,796,091 A * | 8/1998 | Schmidt ................. G02B 26/10 235/472.01 |
| 6,053,413 A | 4/2000 | Swift et al. |
| 6,216,951 B1 | 4/2001 | Swift et al. |
| 6,860,427 B1 | 3/2005 | Schmidt et al. |
| 7,051,943 B2 | 5/2006 | Leone et al. |
| 8,517,273 B2 | 8/2013 | Tamburrini et al. |
| 8,590,795 B2 | 11/2013 | Vincenzi |
| 9,298,961 B2 | 3/2016 | Mazzone et al. |
| 9,361,497 B1 | 6/2016 | Torzilli et al. |
| 9,515,512 B2 | 12/2016 | O'Donnell et al. |
| 2002/0125322 A1 | 9/2002 | McCall et al. |

(Continued)

OTHER PUBLICATIONS

Extended European Search Report, dated May 8, 2018, for European Application No. 18164206.7-1202, 9 pages.

*Primary Examiner* — Matthew Mikels
(74) *Attorney, Agent, or Firm* — Cozen O'Connor

(57) ABSTRACT

Systems and methods for securing and charging a machine-readable symbol reader in a position that enables the machine-readable symbol reader to continue to capture machine readable codes. The machine-readable symbol reader is secured by a stand that includes a base, an arm, and a cradle. The cradle includes a housing that forms a cavity that is sized and shaped to securely receive a portion of the head of the machine-readable symbol reader. The cavity may further align the window on the secured machine-readable symbol reader with an aperture such that the machine-readable symbol reader can continue to capture visual representations of machine-readable symbols. The housing may include a primary inductive charging interface that aligns and inductively couples with a complementary secondary inductive charging interface located within the machine-readable symbol reader to provide power to the machine-readable symbol reader while the machine-readable symbol reader captures visual representations of machine-readable symbols.

11 Claims, 11 Drawing Sheets

(56) References Cited

U.S. PATENT DOCUMENTS

2006/0289654 A1   12/2006  Robinson et al.
2011/0073658 A1*  3/2011  Vassura .............. G06K 7/10881
                                                            235/472.01
2016/0094070 A1    3/2016  Mazzone

* cited by examiner

STAND TO HOLD AND CHARGE A MOBILE MACHINE-READABLE SYMBOL READER

TECHNICAL FIELD

The present disclosure relates to machine-readable symbol reader stands that securely hold and charge machine-readable symbol readers, such as, for example, mobile presentations scanners, in a position that allows the machine-readable symbol readers to continue capturing machine-readable symbols.

BACKGROUND

Description of the Related Art

Machine-readable symbol readers are ubiquitous in today's environment, and may be used for a variety of tasks, from tracking inventory at warehouses and capturing Universal Product Codes (UPC) at store checkouts, to scanning sports, concert, and theme park tickets at entry gates, to name just a few uses. Some machine-readable symbol readers may use one or more transducers to capture or read machine-readable symbols by receiving and capturing electromagnetic waves, such as light waves in the visible spectrum, that have reflected off of or otherwise returned from a machine-readable symbol (e.g., a bar code symbol). To receive and capture these reflected electromagnetic waves, the machine-readable symbol may need to be within a field-of-view of at least one of the transducers in the machine-readable symbol readers. Such a field-of-view may be provided by a window on the machine-readable symbol reader through which the reflected electromagnetic waves may pass to the transducer.

BRIEF SUMMARY

In some implementations, the machine-readable symbol reader may be mobile, enabling the operator to better maneuver the machine-readable symbol reader into a position to capture or read machine-readable symbols. Such mobile machine-readable symbol readers, though, may operate using battery power, and thus, may need to be periodically recharged. Some devices for recharging mobile machine-readable symbol readers include a cradle in which the mobile machine-readable symbol reader is placed, which typically results in a face or window of the mobile machine-readable symbol reader being blocked or obscured by the cradle. Such cradles may further charge the machine-readable symbol readers using electrical contacts that may degrade over time through repeated use and/or exposure to environmental elements.

A stand to hold and charge machine-readable symbol readers with inductive charging interfaces may be summarized as including: a base; a cradle, the cradle comprising a housing having a front end, a back end, a cavity, a first aperture at the back end, and a second aperture at the front end, the cavity which extends through the housing from the first aperture at the back end of the housing toward the second aperture at the front end of the housing, the cavity sized and dimensioned to removably receive at least a portion of a head of a machine-readable symbol reader having a window, with the window of the machine-readable symbol reader facing and aligned with the second aperture of the cradle; an inductive charging interface, the inductive interface located in the housing of the cradle, positioned to inductively couple with a complementary inductive charging interface of the machine-readable symbol reader when the head of the machine-readable symbol reader is securely positioned in the cradle; and a first arm having a first end and a second end, the first arm which extends at the first end thereof from the base, and the cradle that extends from the second end of the first arm.

The cavity of the cradle may have a length, a width and a thickness, the length greater than the width and the width greater that the thickness, and the inductive charging interface of the stand predominately parallel to a plane defined by the length and the width of the cavity. The housing of the cradle may include a major inside surface that delineates a top of the cavity and the inductive charging interface of the stand may be parallel and adjacent to the major inside surface. The housing of the cradle may include a minor inside surface that delineates a bottom of the cavity, and the major and the minor inside surfaces may be spaced to removably secure the head of the machine-readable symbol reader in the cavity.

The coupling between the machine-readable symbol reader and the cradle may be sufficiently stable, and the amount of room between the machine-readable symbol reader and the first arm may be sufficient, such that the machine-readable symbol reader may be handled and manipulated without removing the machine-readable symbol reader from the stand.

The cradle may further include: a first rotatable coupling joint that rotatably couples the major inside surface and the minor inside surface, wherein the first rotatable coupling joint has an axis of rotation that extends laterally across a width of the cavity, and a spring that applies a force to the major inside surface and the minor inside surface, the force to cause the major inside surface and the minor inside surface to rotate towards each other at the back end of the cavity to frictionally removably secure the head of the machine-readable symbol reader in the cavity.

The cradle may further include a spring positioned on the minor inside surface, the spring to engage the head of the machine-readable symbol reader and provide a force to the head of the machine-readable symbol reader in a direction towards the major inside surface to frictionally removably secure the head of the machine-readable symbol reader in the cavity.

The cradle may further include: a side wall, the side wall to physically couple the minor inside surface and the major inside surface in a spaced apart relation to form a tapered cavity that tapers from the front end of the cradle to the backend of the cradle, wherein the tapered cavity is sized and dimensioned to hold the head of the machine-readable symbol reader; a first rotatable coupling joint that rotatably couples the side wall to the second end of the first arm, wherein the first rotatable coupling joint has an axis of rotation that extends laterally across a width of the cradle; and a torsional spring that applies a force to the side wall in the direction towards the major inside surface and away from the minor inside surface.

The force applied by the torsional spring in the direction towards the major inside surface may be less than an opposing force to be applied by a machine-readable symbol reader sized and dimensioned to be held in the tapered cavity, the opposing force to cause the side wall to rotate along the axis of rotation towards the minor inside surface to pivotally removably secure the head of the machine-readable symbol reader in the tapered cavity.

The cradle may further include a first magnet located along the major inside surface, wherein the first magnet aligns with and securely, magnetically couples to a corresponding second magnet located along a top surface of the head of the machine-readable symbol reader.

The second aperture may be a window.

The stand of may further include a second arm having a first end and a second end, the second arm which extends at the first end thereof from the base, and the cradle that extends from the second end of the second arm.

The first arm and the second arm may be spaced apart across a width of the base, wherein at least a portion of the machine-readable symbol reader to suspend between the first support member and the second support member when the cradle has removably received at least a portion of the head of the machine-readable symbol reader.

The stand may further include: a first communications port that comprises a receiver and an antenna; a processor communicatively coupled to the first communications port; a second communications port that is communicatively coupled with the processor; and a nontransitory computer-readable medium communicatively coupled to the processor, wherein the nontransitory computer-readable medium stores processor-executable instructions that specifically program the processor to: store electronic representations of data received by the first communications port from the machine-readable symbol reader; and transmit the electronic representations of data via the second communications port.

The second communications port may further include a power interface to receive power.

A system to capture visual representations of machine-readable symbols may be summarized as including: a machine-readable symbol reader that has a head with a window and a first inductive charging interface; a base; a cradle, the cradle comprising a housing having a front end, a back end, a cavity, a first aperture at the back end, and a second aperture at the front end, the cavity which extends through the housing from the first aperture at the back end of the housing toward the second aperture at the front end of the housing, the cavity sized and dimensioned to removably receive at least a portion of the head of the machine-readable symbol reader with the window of the machine-readable symbol reader facing and aligned with the second aperture of the cradle; and a second inductive charging interface, the second inductive interface located in the housing of the cradle, positioned to inductively couple with the first inductive charging interface of the machine-readable symbol reader when the head of the machine-readable symbol reader is securely positioned in the cradle; and a first arm having a first end and a second end, the first arm which extends at the first end thereof from the base, and the cradle that extends from the second end of the first arm.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn, are not necessarily intended to convey any information regarding the actual shape of the particular elements, and may have been solely selected for ease of recognition in the drawings.

DETAILED DESCRIPTION

In the following description, certain specific details are set forth in order to provide a thorough understanding of various disclosed implementations. However, one skilled in the relevant art will recognize that implementations may be practiced without one or more of these specific details, or with other methods, components, materials, etc. In other instances, well-known structures associated with computer systems, server computers, machine-readable symbols, machine-readable symbol readers, and/or communications networks have not been shown or described in detail to avoid unnecessarily obscuring descriptions of the implementations.

Unless the context requires otherwise, throughout the specification and claims that follow, the word "comprising" is synonymous with "including," and is inclusive or open-ended (i.e., does not exclude additional, unrecited elements or method acts).

Reference throughout this specification to "one implementation" or "an implementation" means that a particular feature, structure or characteristic described in connection with the implementation is included in at least one implementation. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

As used in this specification and the appended claims, the singular forms "a," "an," and "the" include plural referents unless the context clearly dictates otherwise. It should also be noted that the term "or" is generally employed in its sense including "and/or" unless the context clearly dictates otherwise.

The headings and Abstract of the Disclosure provided herein are for convenience only and do not interpret the scope or meaning of the implementations.

Figure 1A:
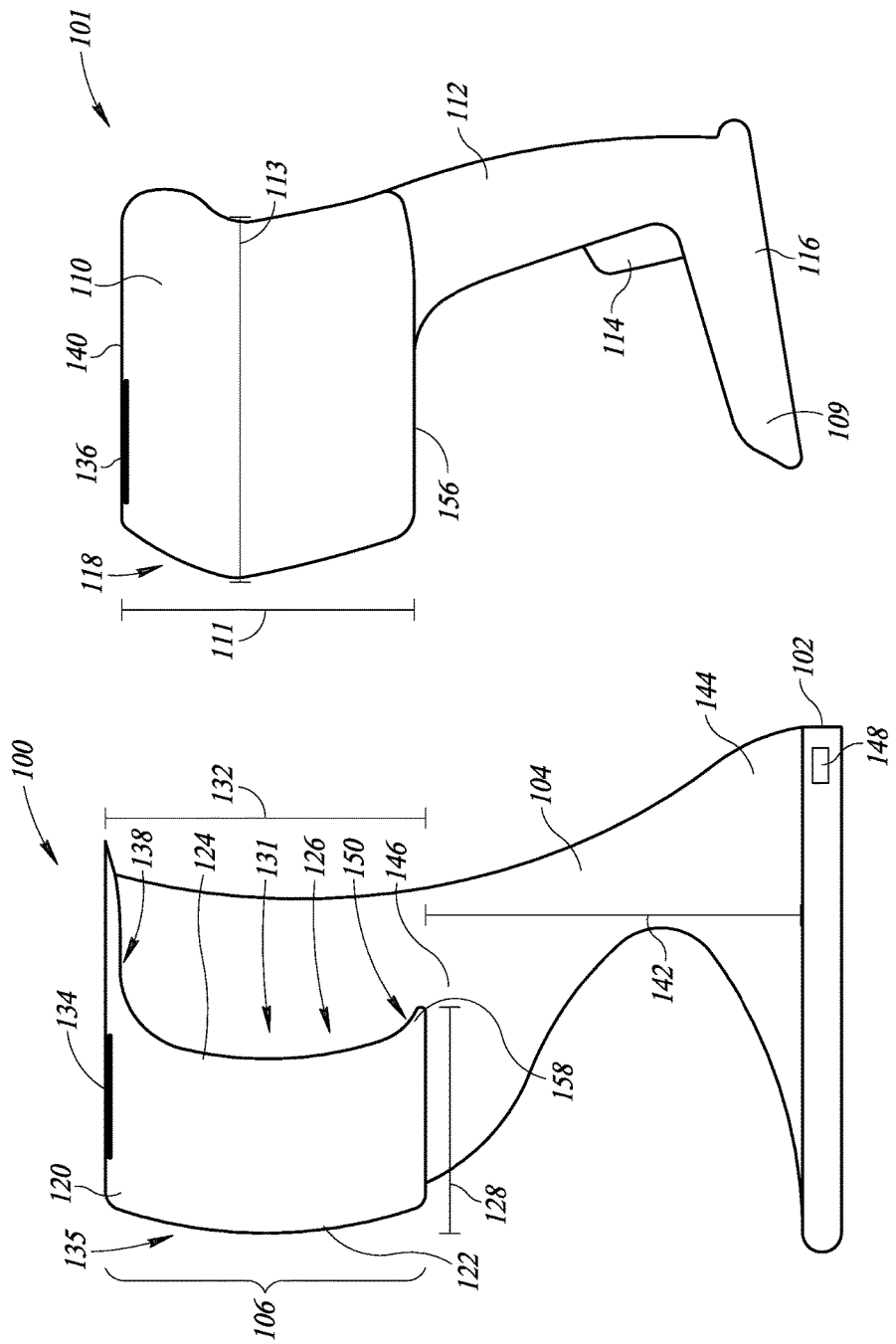
FIG. 1A is a side elevational view of the side of a machine-readable symbol reader and a machine-readable symbol reader stand, according to at least one illustrated implementation.
Figure 1B:
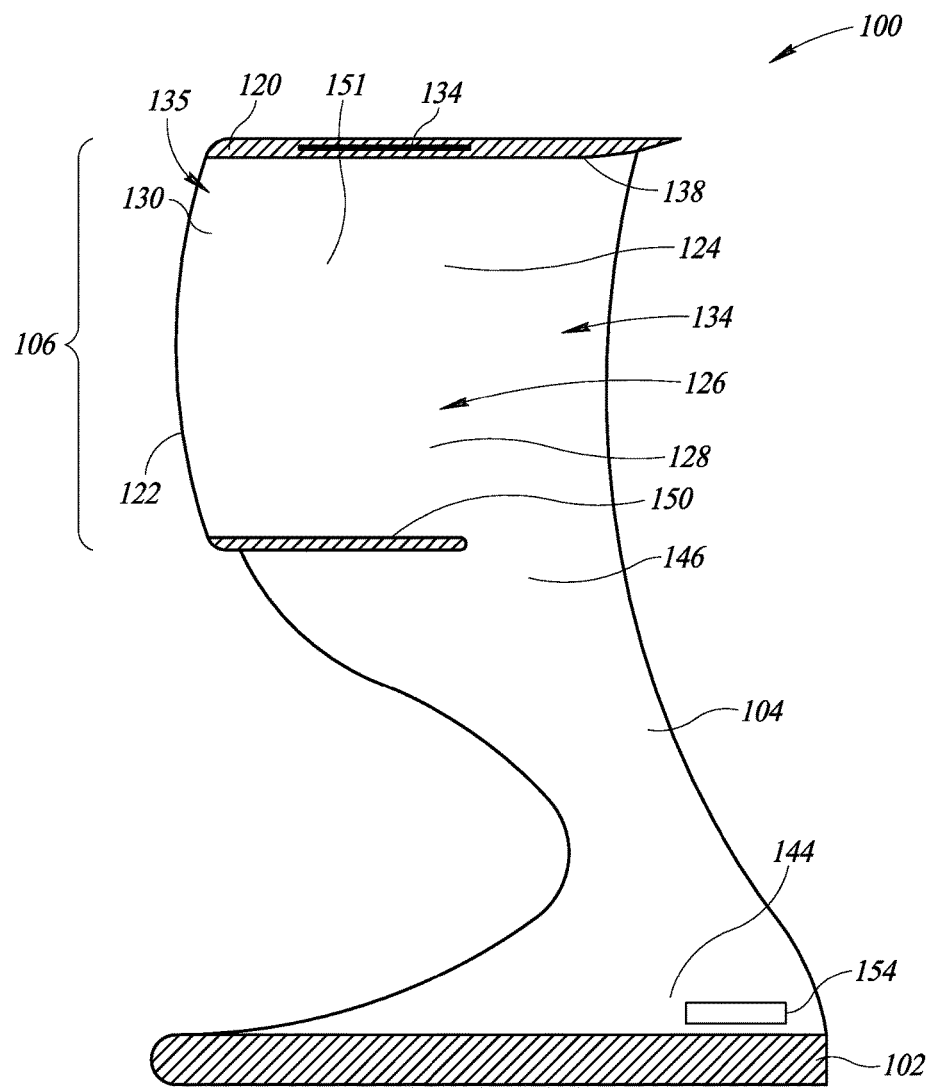
FIG. 1B is a cross-sectional view of the machine-readable symbol reader stand of FIG. 1A.
Figure 1C:
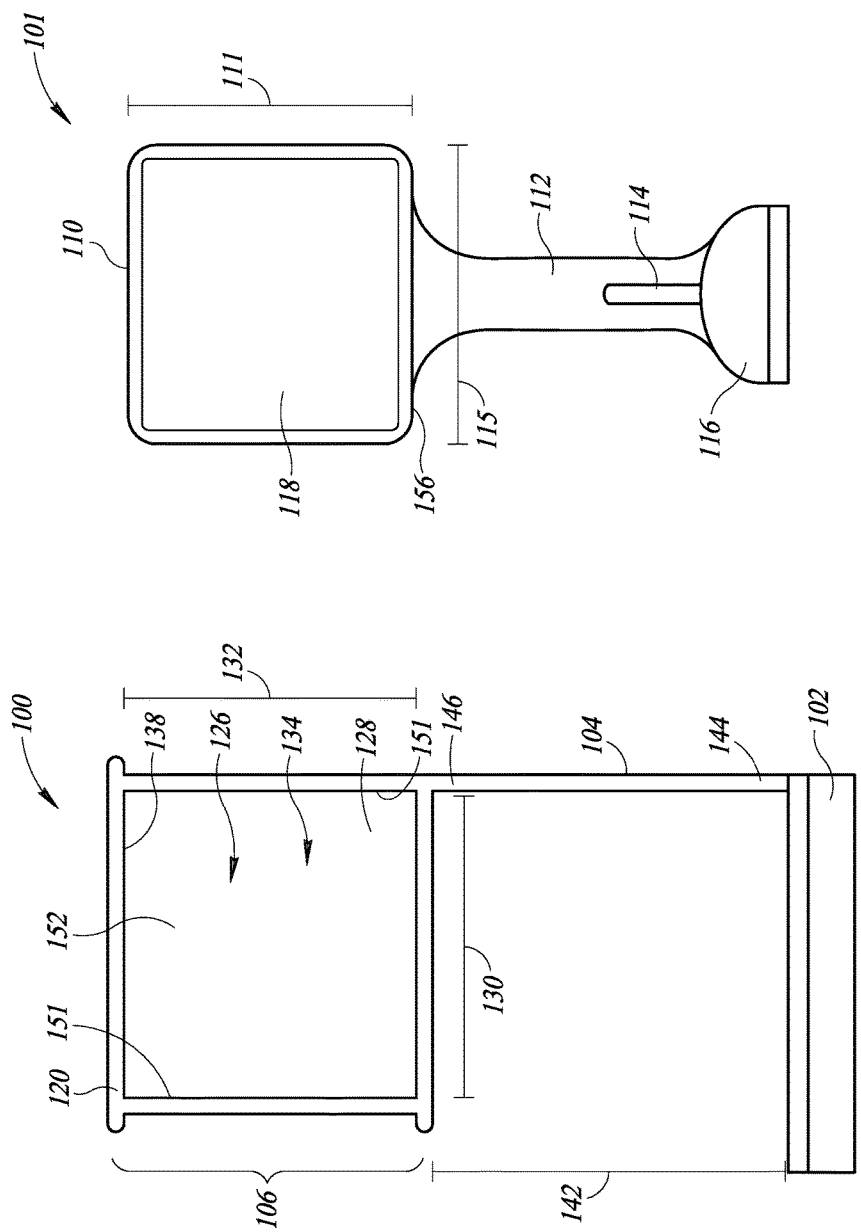
FIG. 1C is a side elevational and front elevational view of the back of a machine-readable symbol reader and a machine-readable symbol reader stand that has one arm and of a machine-readable symbol reader, according to at least one illustrated implementation.

FIGS. 1A, 1B, and 1C show a stand 100 and a machine-readable symbol reader 101, wherein the stand 100 supportingly receives and charges the machine-readable symbol reader 101. The machine-readable symbol reader 101 may include a head 110, a grip 112, a trigger 114, a base 116, and a window 118. The machine-readable symbol reader 101 may have an optional foot 109 that enables the machine-readable symbol reader to be placed in an upright presentation mode. The head 110 may have a height 111, a length 113, and a width 115. The machine-readable symbol reader 101 may be used to optically capture machine-readable symbols, and generating an electronic representation of the machine-readable symbol and/or information encoded in the machine readable symbol. Machine-readable symbols may take any of variety of forms, for example, one-dimensional or barcode symbols, two-dimensional symbols (e.g., area or matrix code symbols) for instance Quick Response ("QR") code symbols, or the like, that may be used to store information and/or data in an optically detectable representation. The window 118 on the machine-readable symbol reader 101 may enable one or more transducers to capture light reflected or returned from such machine-readable symbols. In some implementations, a machine-readable symbol reader 101 may automatically or autonomously capture any machine-readable symbols that are within a field-of-view. In some implementations, a user may cause the capture of a visual representation of the machine-readable symbol, for example by depressing the trigger 114 when a machine-readable symbol is within a field-of-view of the window 118. In some implementations, the grip 112 may be sized and shaped to fit into the user's hand to facilitate the user aiming the machine-readable symbol reader 101 to capture machine-readable symbols.

The stand 100 may include a base 102, an arm 104, and a cradle 106. The cradle 106 may include a housing 120 that has a front end 122 and a back end 124. The housing 120 may form a cavity 126 that has a length 128, a width 130, and a thickness 132, and that extends from a first aperture 131 on the back end 124 to a second aperture 135 on the front end 122 of the stand 100. The length 128, the width 130, and the thickness 132 may be formed along 3 different axes, each axis of which is perpendicular to the other two axes. In some implementations, the length 128 of the cavity 126 may be greater than the width 130 of the cavity 126. Alternatively, or in addition, the width 130 of the cavity 126 may be greater than the thickness 132 of the cavity 126.

The cavity 126 may be sized and dimensioned to securely receive the head 110 of the machine-readable symbol reader 101. At least one of the length 128, the width 130, and the thickness 132 may be sized and dimensioned to secure the machine-readable symbol reader 101, using, for example, frictional forces between one or more inside surfaces of the housing 120 that form the cavity 126 and corresponding exterior surfaces of the machine-readable symbol reader 101. For example, the housing 120 of the cradle 106 may have a major inside surface 138 that delineates a top of the cavity 126 and a minor inside surface 150 that delineates a bottom of the cavity 126. The major inside surface 138 and the minor inside surface 150 may be spaced apart along the thickness 132 of the cradle 106 to securely receive the head 110 of the machine-readable symbol reader 101 and to come into contact with the corresponding top and bottom exterior surfaces of the machine-readable symbol reader 101. The major inside surface 138 and the minor inside surface 150 may be connected by one or more side walls 151. The frictional forces that arise between the major inside surface 138 and the minor inside surface 150 of the housing 120 of the cradle 106, and the corresponding top and bottom exterior surfaces of the machine-readable symbol reader 101, respectively, may secure the machine-readable symbol reader 101 within the housing 120 of the stand 100.

The cavity 126 may be sized and shaped to align the second aperture 135 on the front end 122 of the housing 120 with the window 118 of the machine-readable symbol reader 101 to thereby facilitate the capture or reading of machine-readable symbols. In some implementations, the second aperture 135 may be an opening. In some implementations, the second aperture 135 may include a window 152 of transparent material (e.g., glass, plastic, etc.) to provide additional protection for the window 118 of the machine-readable symbol reader 101. In some implementations, the frictional forces may be sufficiently small such that the user can quickly and easily detach and remove the machine-readable symbol reader 101 from the stand 100 to enable a user to employ the machine-readable symbol reader 101 by hand.

In some implementations, the minor inside surface 150 may be shorter in length than the major inside surface 138. The end of the minor inside surface 150 located proximate the front end 122 of the housing 120 may be substantially aligned within a vertical plane with the end of the major inside surface 138 also located proximate the front end 122 of the housing 120. As such, the end of the major inside surface 138 located proximate the back end 124 of the housing 120 may extend past the end of the minor inside surface 150 located proximate the back end 124 of the housing 120, thereby creating an overhang. The relatively shorter minor inside surface 150 may be sized and positioned to engage a portion of a bottom surface 156 of the machine-readable symbol reader 101 that extends approximately from the window 118 to the grip 112. When the machine-readable symbol reader 101 is securely engaged within the cradle 106, the weight of the grip 112 and the base 116 may result in a downward force being exerted on the machine-readable symbol reader 101. This downward force may further cause the head 110 of the machine-readable symbol reader to rotate about a point 158 located on the minor inside surface 150 at the back end 124 of the housing 120 such that a portion of a top surface 140 of the machine-readable symbol reader 101 rotates towards and engages with the major inside surface 138 of the housing 120. In some implementations, the major inside surface 138 may be shorter in length than the minor inside surface 150, which may result in a relatively smaller portion of the top surface 140 of the machine-readable symbol reader 101 engaging with the major inside surface 138 of the housing 120.

The housing 120 of the cradle 106 may include a primary inductive charging interface 134. The primary inductive charging interface 134 may be located within the housing 120 to align and inductively couple with a complementary secondary inductive charging interface 136 located within the machine-readable symbol reader 101. The primary inductive charging interface 134 may provide power to the machine-readable symbol reader 101 when the primary inductive charging interface 134 and the secondary inductive charging interface 136 are inductively coupled. The primary inductive charging interface 134 may be located proximate to any of the surfaces of the housing 120 that form the cavity 126, such as the major inside surface 150, the minor inside surface 138, and the one or more side walls 151. For example, the primary inductive charging interface 134 may be located proximate a surface of the cavity 126 that is parallel to a plane formed by the axes that run along the length 128 and the width 130 of the cavity 126.

In some implementations, the primary inductive charging interface 134 within the housing 120 may be located along a surface of the cavity 126 that has a relatively large surface area adjacent to a corresponding surface of the machine-readable symbol reader 101. In some implementations, a major inside surface 138 that delineates the top of the cavity 126 may have a relatively large surface area that is adjacent to the top surface 140 of the machine-readable symbol reader 101. Accordingly, the primary inductive charging interface 134 may be located proximate and parallel to the major inside surface 138 at the top of the cavity 126, and the complementary secondary inductive charging interface 136 may be located proximate the top surface 140 of the machine-readable symbol reader 101. As such, the primary inductive charging interface 134 and the secondary inductive charging interface 136 may be aligned when the machine-readable symbol reader 101 is secured within the cavity 126 of the stand 100. In some implementations, the distance between the primary inductive charging interface 134 and the secondary inductive charging interface 136 is equal to or less than 5 millimeters.

The arm 104 extends along a length 142 between the base 102 and the cradle 106. The arm 104 may attach to and extend from the base 102 at a first end 144 and attach to the cradle 106 at a second end 146, from which the cradle 106 extends. In some implementations, the arm 104 may elevate the cradle 106 in a vertical direction such that the cradle 106 receives and secures the head 110 of the machine-readable symbol reader 101 at a position above the ground. In some implementations, the length 142 of the arm 104 may elevate the machine-readable symbol reader 101 such that the grip 112 and the base 116 (and the optional foot 109) of the machine-readable symbol reader 101 are suspended above the base 102 of the stand 100 when the stand 100 secures the head 110 of the machine-readable symbol reader 101 within the cradle 106.

The relative position of the arm 104 and the cradle 106 should provide sufficient room for the user to comfortably handle and manipulate the machine-readable symbol reader 101 while avoiding contact between the hand of the user and the physical structure of the stand 100.

In some implementations, either or both of the cradle 106 and the arm 104 may be positioned to orient the window 118 of the machine-readable symbol reader 101 in one of a plurality of directions when the head 110 of the machine-readable symbol reader 101 is secured within the cradle 106. For example, the cradle 106 and/or the arm 104 may orient the window 118 to face in a downward direction such that a user can advantageously scan machine-readable symbols by presenting the machine-readable symbols within a limited area that is approximately between the cradle 106 and the base 102 of the stand 100.

The base 102 may be sized and dimensioned (e.g., a wide footprint relative to a size of the machine-readable symbol reader 101) such that the stand 100 can securely receive and hold the machine-readable symbol reader 101. The base 102 may include an interface 148 and controller 154. In some implementations, the base 102 may include one or more weights to increase a downward force directed from the base 102 towards the ground, thereby improving the stability of the stand 100. Such improved stability may be used to prevent the stand 100 from being accidently overturned by a user or by-stander, such as, for example, when a user removes the machine-readable symbol reader 101 from the stand 100, thereby enabling a user to quickly and easily remove the machine-readable symbol reader 101 from the stand 100 without upsetting the stand 100.

The base 102 may include the interface 148. In some implementations, the interface 148 may include a wired communication interface, such as a serial port interface, although other interfaces such as a parallel port, a game port, or a universal serial bus ("USB") or mini-USB port can be used. In some implementations, the interface 148 may include a transceiver to provide a wireless communication interface, using wireless protocols such as, for example, Bluetooth™, IEEE 802.11b (or other Wi-Fi standards), infrared data association ("IrDA"), radiofrequency identification ("RFID"), and Near Field Communication ("NFC") protocols. The interface 148 may enable the stand 100 to receive data transmitted by the machine-readable symbol reader 101, such as, for example, data related to machine-readable symbols that the machine-readable symbol reader 101 has captured. The interface 148 may further enable the stand 100 to transmit data related to the machine-readable symbols captured or read by the machine-readable symbol reader 101. Captured data may be transmitted, for example, via a network to one or more backend servers that may store and/or analyze the data. In some implementations, the interface 148 may include a power interface to provide power to the stand 100. In some implementations, both power and communication may be provided by a single interface 148, such as, for example, by using a USB or other similar type of connector. A communications interface may include one or more wired ports or optical ports, and/or one or more radios (e.g., transmitter, receiver, transceiver) and associated antenna.

The base 102 may include controller 154. In some implementations, the controller 154 may include one or more processors that execute processor-executable instructions that enable the stand 100, for example, to power various components and/or to communicate with other devices.

Figure 2:
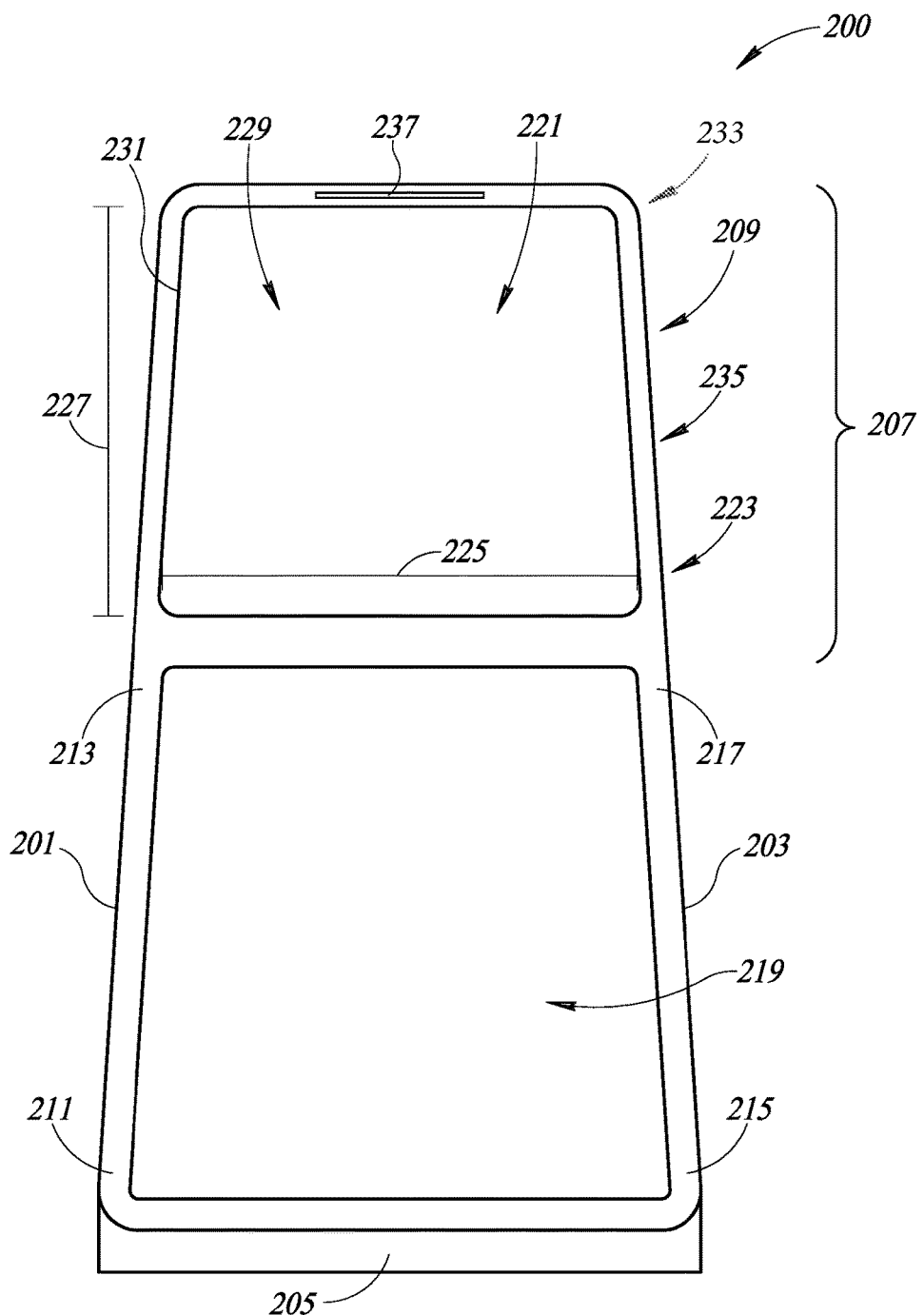
FIG. 2 is a rear elevational view of a machine-readable symbol reader stand that has two arms, according to at least one illustrated implementation.

FIG. 2 shows a stand 200 that includes a first arm 201 and a second arm 203 that extend outward from a base 205 and support a housing 207 for a cradle 209, according to at least one illustrated implementation. The first arm 201 may have a first end 211 and a second end 213, and the first arm 201 may attach to and extend from the base 205 at the first end 211 and attach to the cradle 209 at the second end 213, from which the cradle 209 extends. The second arm 203 may have a first end 215 and a second end 217, and the second arm 203 may attach to and extend from the base 205 at the first end 215 and attach to the cradle 209 at the second end 217, from which the cradle 209 extends. The first arm 201 and the second arm 203 may be separated by a first cavity 219. In some implementations, the first arm 201 and the second arm 203 may be substantially parallel to each other such that the distance between the first arm 201 and the second arm 203 is substantially equal at the base 205 and at the cradle 209. In some implementations, the first arm 201 and the second arm 203 may be angled towards each other such that the distance between the first arm 201 and the second arm 203 is greater at the base 205 than at the cradle 209. In some implementations, the first arm 201 and the second arm 203 may be angled away each other such that the distance between the first arm 201 and the second arm 203 is less at the base 205 than at the cradle 209.

The relative position of the first arm 201, the second arm 203, and the cradle 209 should provide sufficient room for the user to comfortably handle and manipulate the machine-readable symbol reader 101 while avoiding contact between the hand of the user and the physical structure of the stand 200.

The housing 207 may form a second cavity 221 that has a length 223, a width 225, and a thickness 227. The second cavity 221 may extend from a first aperture 229 on the back end 231 to a second aperture 233 on the front end 235 of the stand 200. The housing 207 of the cradle 209 may include a primary inductive charging interface 237 that may be located within the housing 207 to align and inductively couple with a complementary secondary inductive charging interface 136 located within the machine-readable symbol reader 101. The second cavity 221 may be sized and dimensioned to securely receive a head 110 of a machine-readable symbol reader 101. At least one of the length 223, the width 225, and the thickness 227 may be sized and dimensioned to secure the machine-readable symbol reader 101, using, for example, frictional forces between one or more inside surfaces of the housing 207 that form the second cavity 221 and corresponding exterior surfaces of the machine-readable symbol reader 101. The first arm 201 and the second arm 203 may elevate the machine-readable symbol reader 101 when the head 110 is securely received in the second cavity 221 such that the grip 112 and the base 116 (and the optional foot 109) of the machine-readable symbol reader 101 are suspended above the base 205 of the stand 200.

Figure 3:
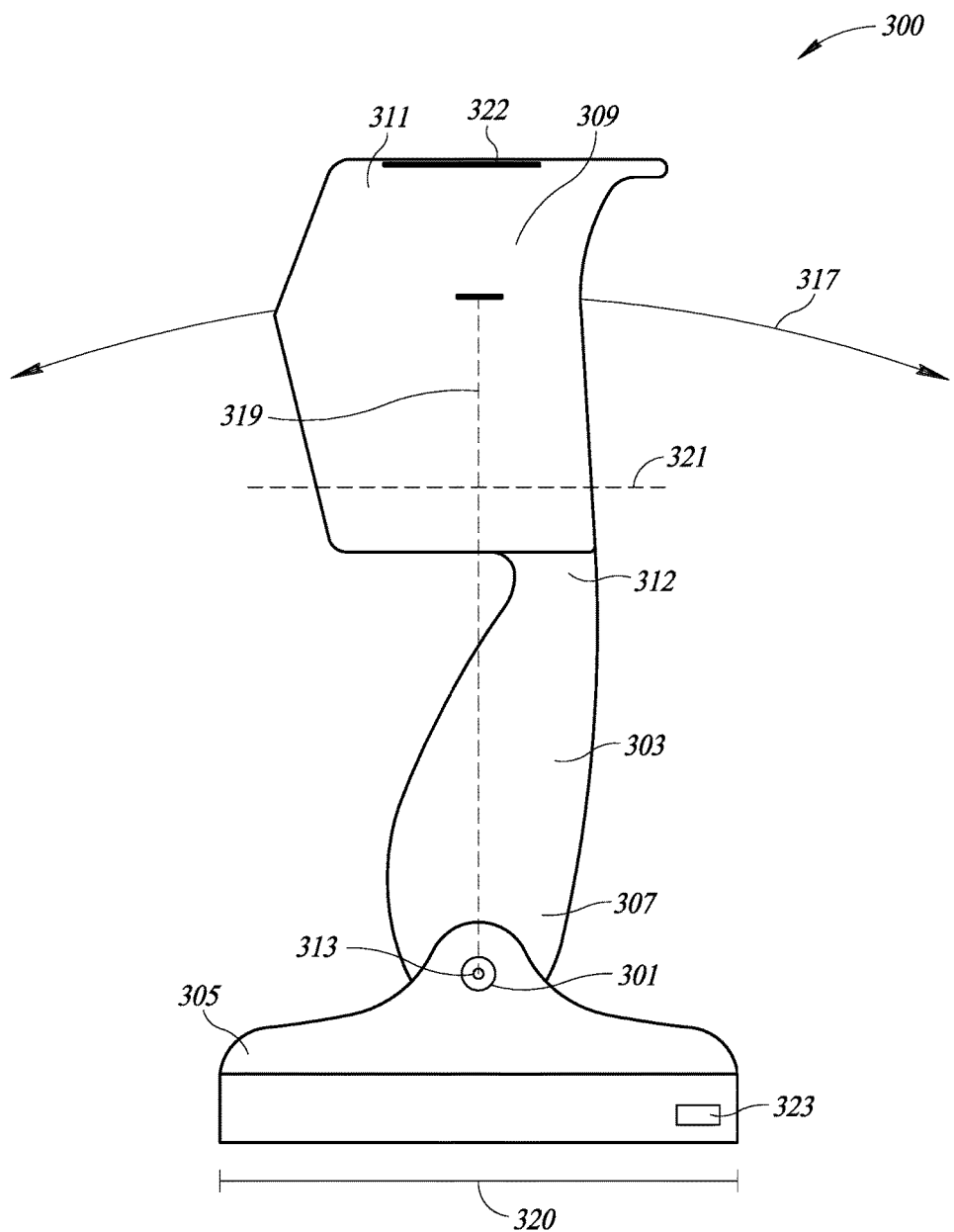
FIG. 3 is a side elevational view of the side of a machine-readable symbol reader stand that has a rotatable joint between an arm and a base, according to at least one illustrated implementation.

FIG. 3 is a view of the side of a machine-readable symbol reader stand 300 that has a rotatable coupling joint 301 that rotatably couples an arm 303 to a base 305 of the stand 300, according to at least one illustrated implementation. The arm 303 may extend from the rotatable coupling joint 301 at a first end 307 and attach to a housing 309 that forms a cradle 311 at a second end 312, from which the housing 309 extends. The rotatable coupling joint 301 may provide an axis of rotation 313 that extends along a width of the base 305. The axis of rotation 313 may enable the housing 309 to rotate along an arc 317 that has a radius of curvature 319 that extends from the rotatable coupling joint 301 to housing 309 for the cradle 311. As such, the housing 309 for the cradle 311 may rotate about the arc 317, thereby enabling a window 118 of a machine-readable symbol reader 101 secured within the cradle 311 to be oriented to face in various angles with respect to a horizontal axis 321 that runs parallel to a length 320 of the base 305. For example, when the base 305 is positioned on a flat surface horizontal to the ground, the window 118 of a machine-readable symbol reader 101 secured within the cradle 311 may be aimed to face in an upward direction or a downward direction to capture machine-readable symbols.

The rotatable coupling joint 301 may provide an electrical conduit and/or junction that enables an electrical connection to pass from the base 305 to the housing 309. In such an implementation, for example, a primary inductive charging interface 322 located in the housing 309 of the cradle 311 may be electrically coupled to a power interface 323 (e.g., a power connector) located in the base 305 via the electrical conduit and/or junction provided by the rotatable coupling joint 301.

In some implementations, the stand 300 may include a first arm 303a and a second arm 303b rotatably coupled to the base 305 via a first rotatable coupling joint 301a and a second rotatable coupling joint 301b, respectively. The first rotatable coupling joint 301a may be located opposite the second rotatable coupling joint 301b across the width of the base 305.

Figure 4:
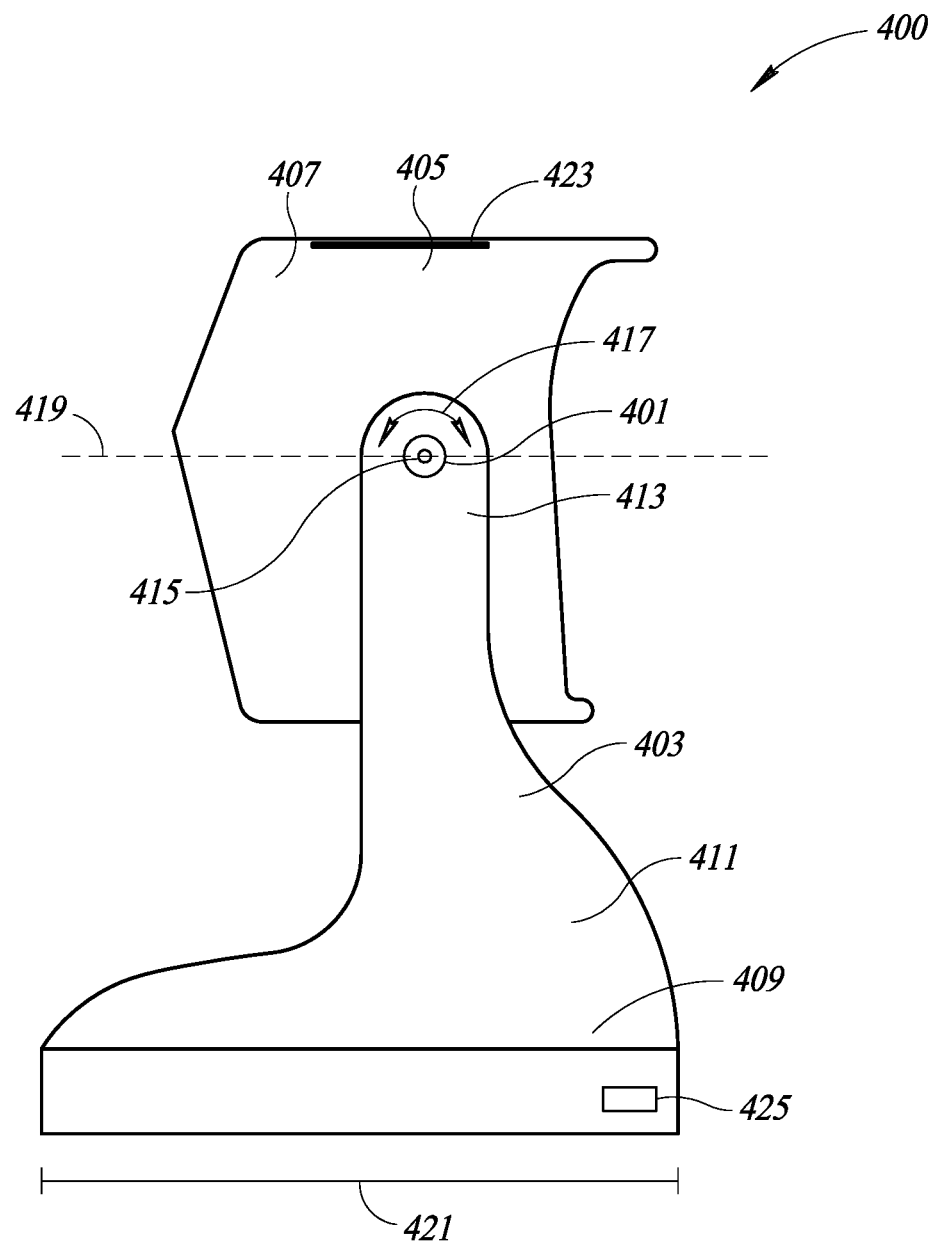
FIG. 4 is a side elevational view of the side of a machine-readable symbol reader stand that has a rotatable coupling joint between an arm and a cradle, according to at least one illustrated implementation.

FIG. 4 shows the side of a machine-readable symbol reader stand 400 that has a rotatable coupling joint 401 that rotatably couples an arm 403 to a housing 405 that forms a cradle 407 of the stand 400, according to at least one illustrated implementation. The arm 403 may attach to and extend from a base 409 at a first end 411 and attach to the housing 405 that forms the cradle 407 at a second end 413. The rotatable coupling joint 401 may provide an axis of rotation 415 that extends along a width of the base 409. The axis of rotation 415 may enable the housing 405 for the cradle to rotate 417 about the rotatable coupling joint 401. As such, a window 118 of a machine-readable symbol reader 101 secured within the cradle 407 may be oriented to face in various angles with respect to a horizontal axis 419 that runs parallel to a length 421 of the base 409. For example, when the base 409 is positioned on a flat surface horizontal to the ground, the window 118 of a machine-readable symbol reader 101 secured within the cradle 407 may be aimed to face in an upward direction or a downward direction to capture or read machine-readable symbols.

The rotatable coupling joint 401 may provide an electrical conduit and/or junction that enables an electrical connection to pass from the arm 403 through the rotatable coupling joint 401 to the housing 405. In such an implementation, a primary inductive charging interface 423 located in the housing 405 of the cradle 407 may be electrically coupled to a power interface 425 (e.g., a power connector) located in the base 409 via the electrical conduit and/or junction provided by the rotatable coupling joint 401.

In some implementations, the stand 400 may include a first arm 403a and a second arm 403b rotatably coupled to the housing 405 that forms the cradle 407 via a first rotatable coupling joint 401a and a second rotatable coupling joint 401b, respectively. The first rotatable coupling joint 401a may be located opposite the second rotatable coupling joint 401b across the width of the housing 405.

Figure 5:
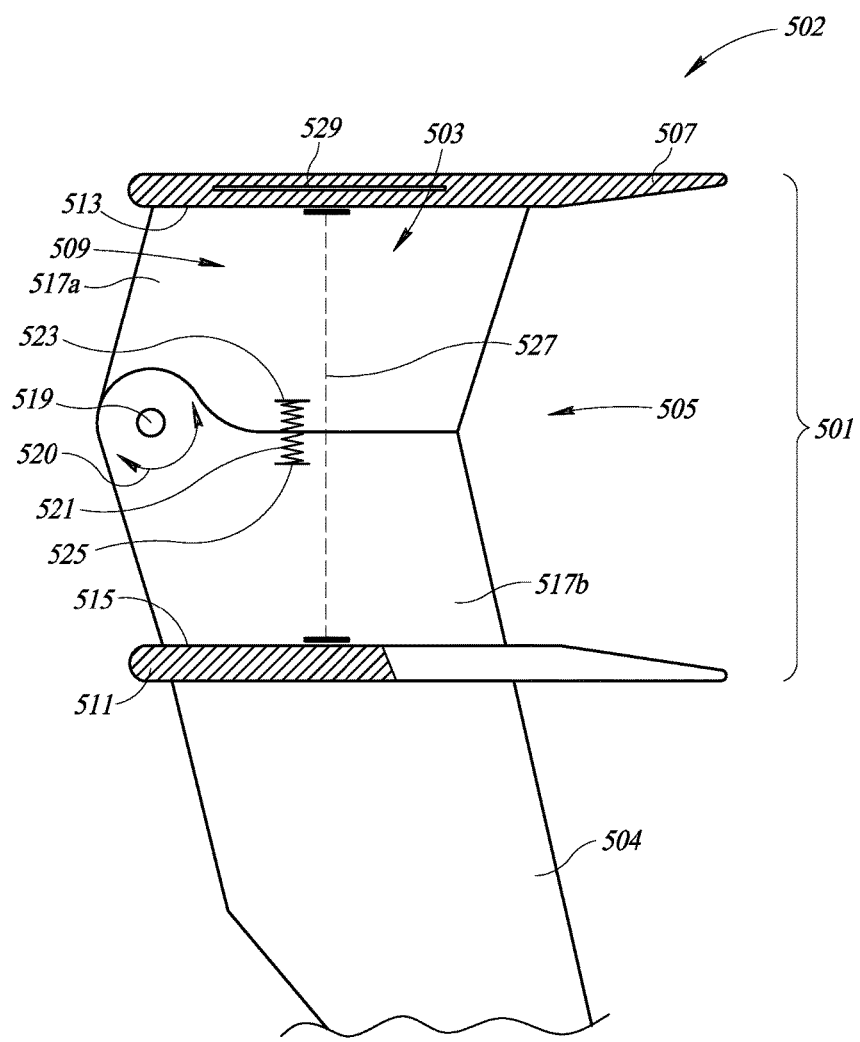
FIG. 5 is a cross-sectional view of a portion of the stand showing a cradle that includes a housing that secures a machine-readable symbol reader within a cavity by using a spring to apply an inward force to two opposing sides of a cradle, according to at least one illustrated implementation.

FIG. 5 shows a cross-sectional view of a cradle 502 that includes a housing 501 and a cavity 503 to secure the machine-readable symbol reader 101 by using a spring 521 to bias a major inside surface 513 and a minor inside surface 515 of the housing 501 to rotate towards each other relative to a rotatable coupling joint 519, such as a hinge, according to at least one illustrated implementation. The cradle 502 may attach to an arm 504 that extends towards a base 102. In some implementations, the cradle 502 may attach to two arms that may be parallel to each other and separated by the width 130 of the cavity 503. The cavity 503 may extend from a first aperture 505 on a back end 507 of the housing 501 to a second aperture 509 on a front end 511 of the housing 501. The housing 501 may include a major inside surface 513 that delineates the top side of the cavity 503 and a minor inside surface 515 that delineates the bottom side of the cavity 503. A primary inductive charging interface 529 may be included within the housing 501 proximate the major inside surface 513. The major inside surface 513 may be physically coupled or joined to an upper side wall 517*a*, and the minor inside surface 515 may be physically coupled or joined to a lower side wall 517*b*. The upper side wall 517*a* and the lower side wall 517*b* may be rotatably coupled via a rotatable coupling joint 519 located proximate the second aperture 509. The rotatable coupling joint 519 may provide for rotation 520 of the major inside surface 513 and/or the minor inside surface 515 along an axis of rotation that extends through the rotatable coupling joint 519 and runs laterally across the width 130 of the cavity 503. A spring 521 may be coupled at a first end 523 to the upper side wall 517*a* and at a second end 525 to the lower side wall 517*b*. The spring 521 may be located relatively towards the first aperture 505 compared to the rotatable coupling joint 519, and may provide a compressional force that opposes rotation of one or both of the major inside surface 513 and the minor inside surface 515 away from the cavity 503.

The housing 501 may be sized an shaped such that a thickness 527 for the interior of the cavity 503 is less than the height 111 of the head 110 of a machine-readable symbol reader 101 to be secured within the housing 501. In some implementations, one or both of the major inside surface 513 and the minor inside surface 515 may bulge inwards towards the cavity 503 at or proximate the center of the cavity 503 between the first end 523 of the housing 501 and the second end 525 of the housing 501, thereby decreasing the thickness 527 of the cavity 503 at this location. In some implementations, one or both of the major inside surface 513 and the minor inside surface 515 may be beveled at or proximate to the first aperture 505 on the back side 507 of the housing 501. Such beveling of one or more of the major inside surface 513 and the minor inside surface 515 may increase the distance between these two surfaces 513, 515 at the back side 507 of the housing and thereby facilitate the ability of the user to insert the head 110 of the machine-readable symbol reader 101 into the cavity 503.

As the head 110 is fully inserted into the cavity 503, the top and bottom sides of the head 110 come into contact with and exert an outward force on the major inside surface 513 and the minor inside surface 515, respectively. This outward force may be greater than the inward force being asserted by the spring 521, thereby causing one or both of the major inside surface 513 and the minor inside surface 515 to rotate relative to the axis of rotation running through the rotatable coupling joint 519 outward and away from the cavity 503 until the thickness 527 of the cavity 503 has increased to accommodate the height 111 of the head 110 of the machine-readable symbol reader 101. When the head 110 is fully inserted into the cavity 503, the frictional forces between the major inside surface 513 and the top of the head 110, and/or between the minor inside surface 515 and the bottom of the head 110 may be sufficient to maintain the head 110 within the cavity 503, thereby securing the machine-readable symbol reader 101 to the stand 100. In addition, the above frictional forces may maintain the position and orientation of the head 110 within the cavity 503 such as to align the window 118 of the machine-readable symbol reader 101 with the second aperture 509 at the front end 511 of the housing 501 and thereby facilitate the capture or reading of machine-readable symbols by the machine-readable symbol reader 101. In some implementations, the above frictional forces may maintain the position and orientation of the head 110 within the cavity 503 such as to align the primary inductive charging interface 529 in the housing 501 with the secondary inductive charging interface 136 located at the top surface of the head 110 of the machine-readable symbol reader 101 to facilitate charging of the machine-readable symbol reader 101. The machine-readable symbol reader 101 may be quickly and easily removed from the stand 100, for example, by a user grasping the grip 112 and pulling the head 110 out of the cavity 503.

Figure 6:
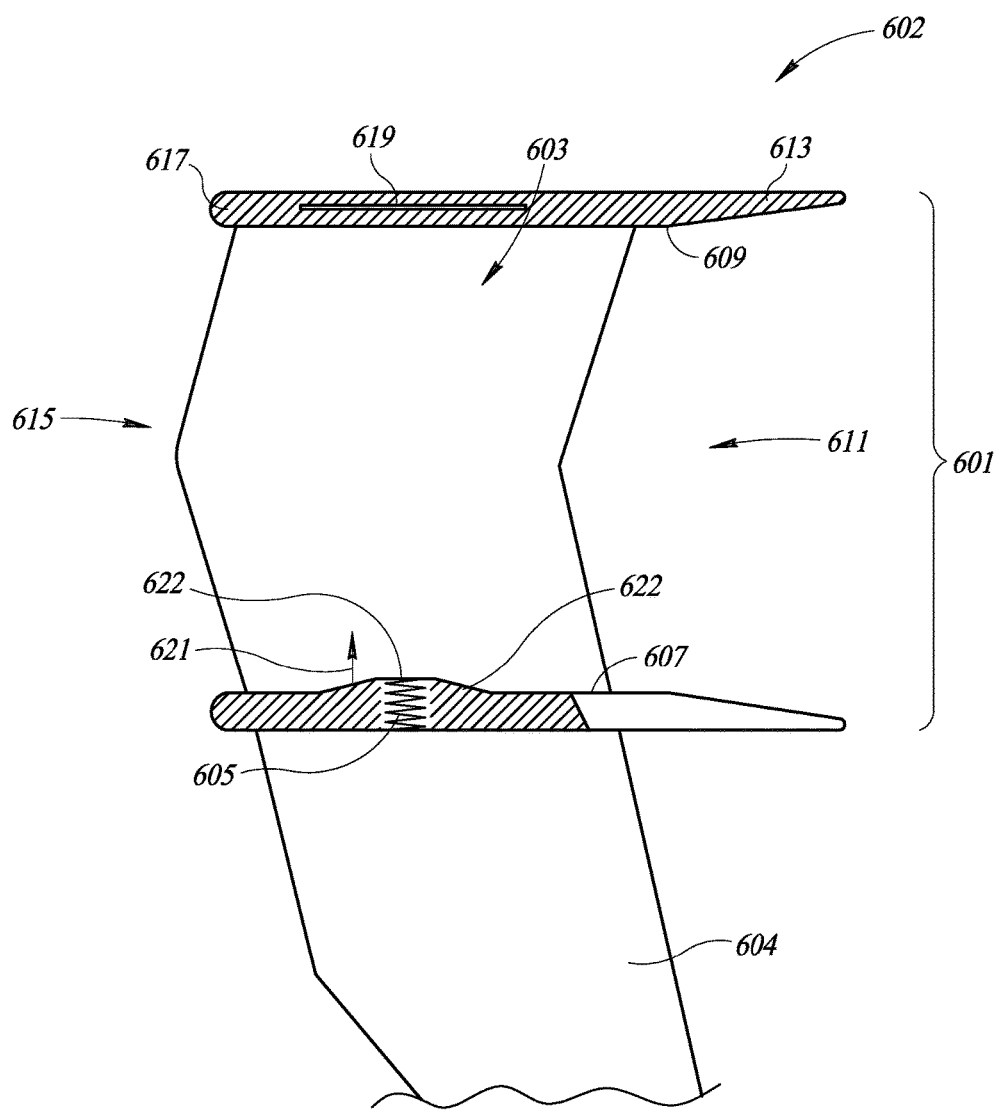
FIG. 6 is a cross-sectional view of a portion of the stand showing a cradle that includes a housing that secures a machine-readable symbol reader within a cavity by using a spring to apply a force to the machine-readable symbol reader directed towards an opposing surface, according to at least one illustrated implementation.

FIG. 6 illustrates a cross-sectional view of a cradle 602 that includes a housing 601 and a cavity 603 to secure the machine-readable symbol reader 101 by using a spring 605 located in the minor inside surface 607 to push the head 110 of the machine-readable symbol reader 101 towards the major inside surface 609, according to at least one illustrated implementation. The cradle 602 may attach to an arm 604 that extends towards a base 102. In some implementations, the cradle 602 may attach to two arms that may be parallel to each other and separated by the width 130 of the cavity 603. The cavity 603 may extend from a first aperture 611 on a back end 613 of the housing 601 to a second aperture 615 on a front end 617 of the housing 601. The major inside surface 609 delineates the top side of the cavity 603, and the minor inside surface 607 delineates the bottom side of the cavity 603. A primary inductive charging interface 619 may be included within the housing 601 proximate the major inside surface 609. The housing 601 may include the spring 605 located along the minor inside surface 607 and to provide an force 621 at a top surface 623 of the spring 605 directed towards the major inside surface 609. In some implementations, the spring 605 may be located at or proximate the second aperture 615 towards the front end 617 of the housing 601. In some implementations, the spring may be located at or proximate a center of the cavity between the first aperture 611 and the second aperture 615. In some implementations, the spring 605 may be located at or proximate the first aperture 611 towards the back end 613 of the housing 601.

The housing 601 may be sized and shaped to receive and secure the head 110 of a machine-readable symbol reader 101. Thus, the width 130 and the thickness 132 of the housing 601 may be slightly larger than the corresponding width 115 and height 111 of the head 110 of the machine-readable symbol reader 101 to be secured within the housing 601. As the head 110 is fully inserted into the cavity 603, the bottom side of the head 110 encounters and moves over the spring 605. In some implementations, the spring 605 may extend past the minor inside surface 607 and into the cavity 603. In such an implementation, the spring 605 may be covered by a flap or covering 622 that provides a gradual transition from the minor inside surface 607 to the top surface 623 of the spring 605. The bottom side of the head 110 may push down on this covering 622, thereby depressing the spring 605 and enabling the bottom side of the head 110 to move up and over the spring 605 towards the second aperture 615 on the front end 617 of the housing 601.

When the head 110 is fully inserted into the cavity 603, the force 621 from the spring 605 may be applied towards the bottom side of the head 110, causing the head 110 to move upward in the cavity 603 until the top side of the head 110 comes into contact with the major inside surface 609. Frictional forces between the major inside surface 609 and the top of the head 110 maintain the head 110 within the cavity 603, thereby securing the machine-readable symbol reader 101 to the stand 100. In addition, the above frictional forces may maintain the position and orientation of the head 110 within the cavity 603 such as to align the window 118 of the machine-readable symbol reader 101 with the second aperture 615 at the front end 617 of the housing 601 and thereby facilitate the capture or reading of machine-readable symbols by the machine-readable symbol reader 101. In some implementations, the above frictional forces may maintain the position and orientation of the head 110 within the cavity 603 such as to align the primary inductive charging interface 619 in the housing 601 with the secondary inductive charging interface 136 located at the top surface of the head 110 of the machine-readable symbol reader 101 to facilitate charging of the machine-readable symbol reader 101. The machine-readable symbol reader 101 may be quickly and easily removed from the stand 100, for example, by a user grasping the grip 112 and pulling the head 110 out of the cavity 603. Although illustrated by the spring 605 located along the minor inside surface 607, the spring 605 may be located on any of the surfaces of the cavity 603, including the major inside surface 609 and/or one or more of the side walls, to securely position the machine-readable symbol reader 101.

Figure 7:
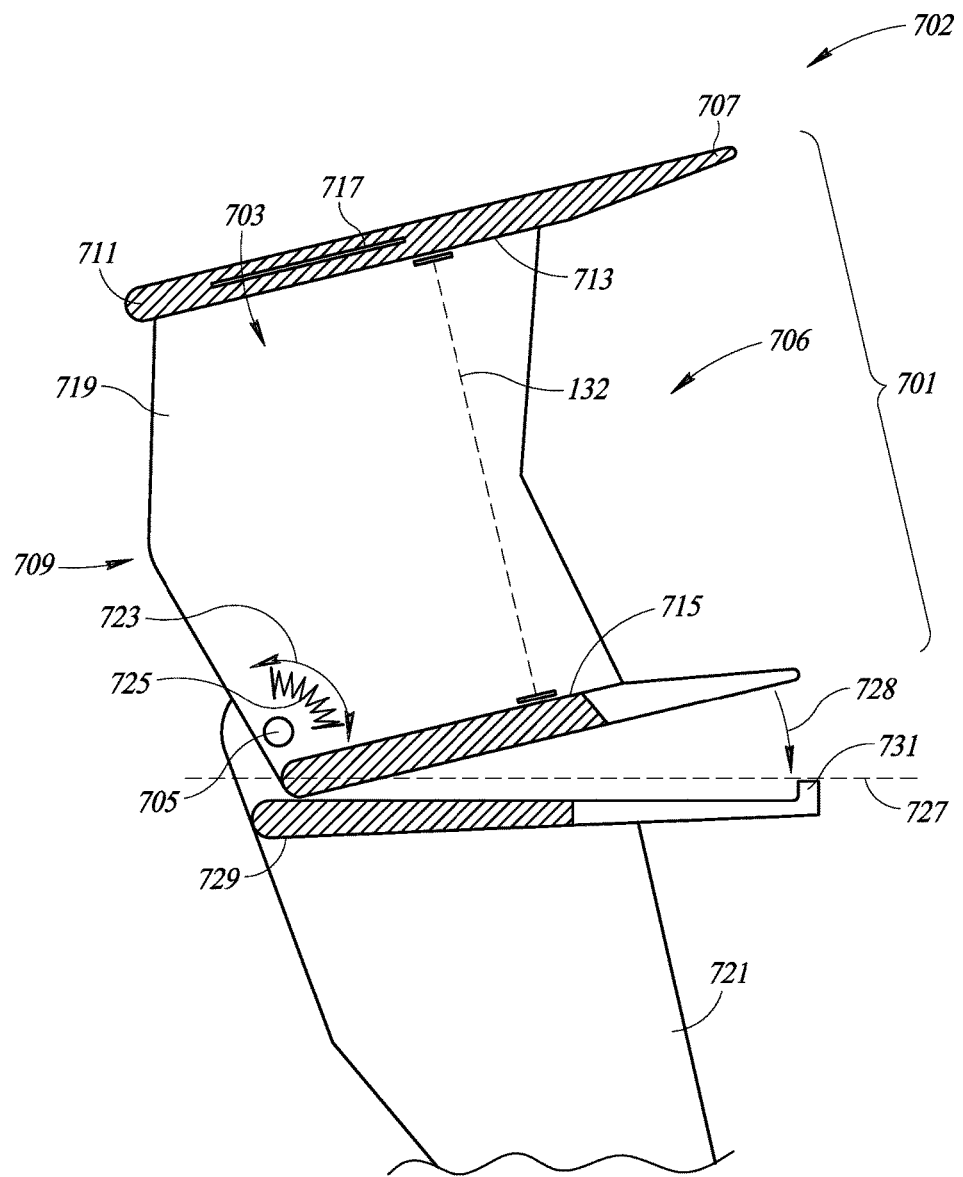
FIG. 7 is a cross-sectional view of a portion of the stand showing a cradle that secures a machine-readable symbol reader within a cavity by using a torsional spring to apply a force that biases the cavity in an upward angle in an open position, wherein the cavity rotates to a closed position under the weight of a machine-readable symbol reader when the machine-readable symbol reader is secured within the cavity, according to at least one illustrated implementation.

FIG. 7 shows a cross-sectional view of a cradle 702 that includes a housing 701 and a cavity 703 to secure the machine-readable symbol reader 101 by rotating the cradle 702 relative to a rotatable coupling joint 705, such as a hinge, from an open, inclined position to a closed position, according to at least one illustrated implementation. The cradle 702 may attach to an arm 721 that extends towards a base 102. In some implementations, the cradle 702 may attach to two arms that may be parallel to each other and separated by the width 130 of the cavity 703. The cavity 703 may extend from a first aperture 706 on a back end 707 of the housing 701 to a second aperture 709 on a front end 711 of the housing 701. The housing 701 may include a major inside surface 713 that delineates the top side of the cavity 703 and a minor inside surface 715 that delineates the bottom side of the cavity 703. A primary inductive charging interface 717 may be included within the housing 701 proximate the major inside surface 713. The major inside surface 713 and the minor inside surface 715 may be physically coupled by a side wall 719 that may extend perpendicularly to the major inside surface 713 and/or the minor inside surface 715 along a thickness 132 of the cavity 703.

The housing 701 of the cradle 702 may be sized and shaped to receive and secure the head 110 of a machine-readable symbol reader 101. In some implementations, the major inside surface 713 and/or the minor inside surface 715 may be tapered such that the distance between the two surfaces is relatively greater at the first aperture 706 than at the second aperture 709. Thus, the thickness 132 at the first aperture 706 of the housing 701 may be substantially larger than the height 111 of the head 110 of the machine-readable symbol reader 101 to be secured within the housing 701, whereas the thickness 132 at the second aperture 709 of the housing 701 may be only slightly larger or even less than the height 111 of the head 110 of the machine-readable symbol reader 101. Such tapering may facilitate the ability of the user to place the head 110 of the machine-readable symbol reader 101 within the cavity 703 and serve to secure the head 110 within the cavity 703 when the head 110 is fully inserted.

The side wall 719 of the housing 701 may be rotatably coupled to the arm 721 via the rotatable coupling joint 705, which may allow rotation 723 of the cradle 702 along an axis of rotation that extends through the rotatable coupling joint 705 and runs laterally across the width 130 of the cavity 703. The housing 701 may be physically coupled to a torsional spring 725 that applies a force to the housing 701 and the cradle 702 in an upward direction away from the arm 721. When the housing 701 is empty (e.g., when no machine-readable symbol reader 101 is secured in the cavity 703) the upward force of the torsional spring may bias the cradle 702 to be in an inclined position such that the minor inside surface 715 forms a non-zero angle with the horizontal line 727. As the head 110 is fully inserted into the cavity 703, the weight of the machine-readable symbol reader 101 may apply a downward force to the housing 701 that directed towards the arm 721. The downward force from the weight of the machine-readable symbol reader 101 may be greater than the upward force from the torsional spring 725, causing the cradle 702 to rotate in a downward arc 728 towards the arm 721. In some implementations, the arm 721 may include a horizontal shelf 729 or other similar structure to stop the rotation of the cradle 702 and thereby secure the machine-readable symbol reader 101 in a desired position and/or orientation. In some implementations, the horizontal shelf 729 may include a latch 731 to secure the housing 701 by opposing further rotation.

When the head 110 is fully inserted into the cavity 703, the frictional forces between the major inside surface 713 and the top of the head 110, and/or between the minor inside surface 715 and the bottom of the head 110 may be sufficient to maintain the head 110 within the cavity 703, thereby securing the machine-readable symbol reader 101 to the stand 100. Such frictional forces may be relatively greater at the tapered, second aperture 709 than at the relatively wider first aperture 706. Such frictional forces may maintain the position and orientation of the head 110 within the cavity 703 such as to align the window 118 of the machine-readable symbol reader 101 with the second aperture 709 at the front end 711 of the housing 701 and thereby facilitate the capture or reading of machine-readable symbols by the machine-readable symbol reader 101. In some implementations, the above frictional forces may maintain the position and orientation of the head 110 within the cavity 703 such as to align the primary inductive charging interface 717 in the housing 701 with the secondary inductive charging interface 136 located at the top surface of the head 110 of the machine-readable symbol reader 101 to facilitate charging of the machine-readable symbol reader 101. The machine-readable symbol reader 101 may be quickly and easily removed from the stand 100, for example, by a user grasping the grip 112 to rotate the housing 701 to the inclined position and then pull the head 110 out of the cavity 703.

Figure 8:
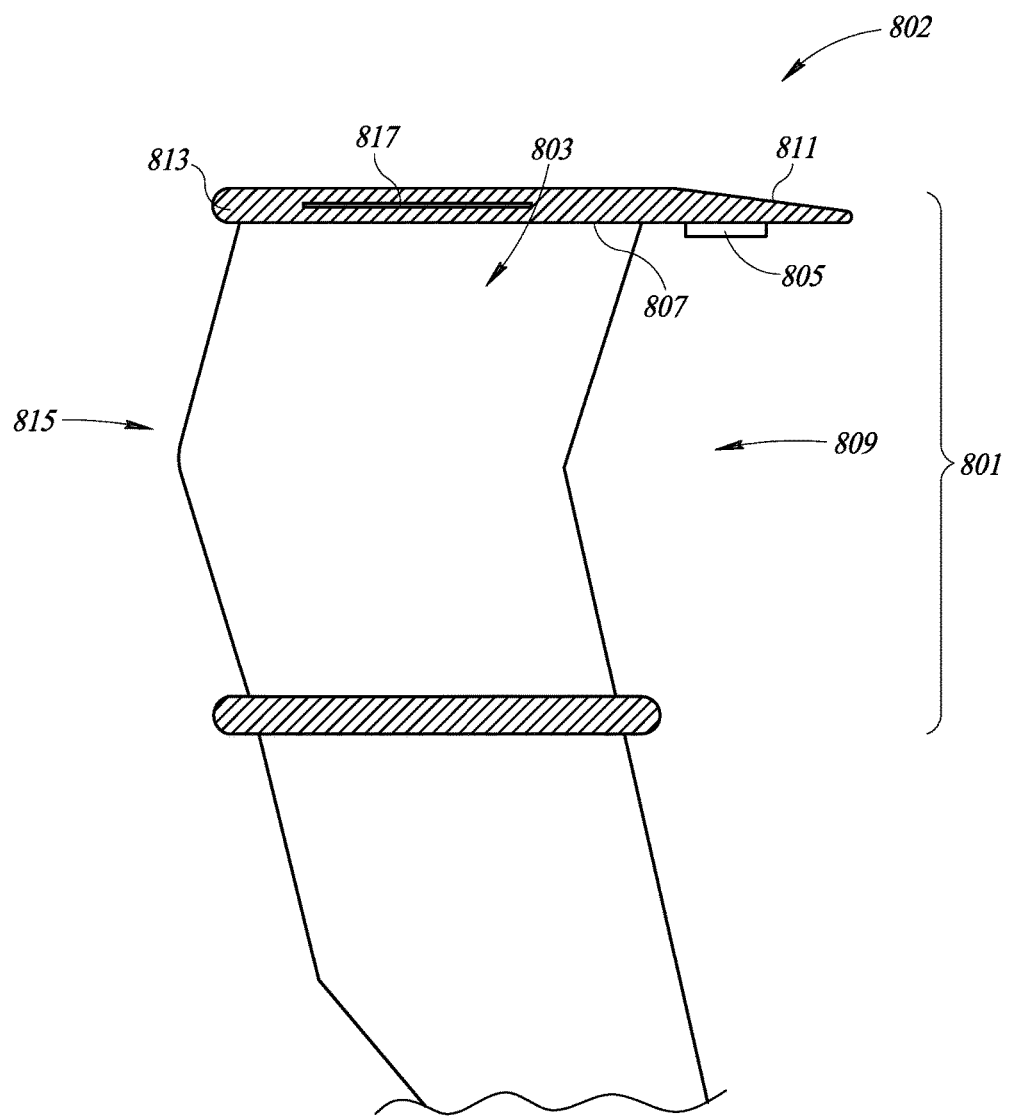
FIG. 8 is a cross-sectional view of a portion of the stand showing a cradle that secures a machine-readable symbol reader within a cavity by using one or more securing features located along a major inside surface of the cavity that securely attaches a corresponding securing feature located along the head of the machine-readable symbol reader, according to at least one illustrated implementation.

FIG. 8 is a cross-sectional view of a portion of a cradle 802 that includes a housing 801 and a cavity 803 to secure the machine-readable symbol reader 101 by using one or more securing features 805 located along the major inside surface 807, according to at least one illustrated implementation. The one or more securing features 805 may securely couple to one or more corresponding securing features located on the top of the head 110 of the machine-readable symbol reader 101. The securing feature 805 may, for example, be a magnet of a first polarity located along the major inside surface 807 proximate a first aperture 809 on a back side 811 of the cradle 802. A corresponding magnet of the opposite polarity may be located along the top of the head 110 of the machine-readable symbol reader 101 such that the two magnets align and become securely, magnetically coupled as the machine-readable symbol reader 101 is inserted into the cavity 803 towards a front end 811 of the housing 801. In such an implementation, the securing feature 805 may be a slot that forms a cavity with an opening that faces the backside 811 of the cradle 802. The slot may be sized and shaped to securely receive a tab that projects outward from the top of the head 110 of the machine-readable symbol reader 101 as the machine-readable symbol reader 101 is inserted into the cavity 803 towards the front end 813 of the housing 801. In some implementations, the one or more securing features 805 may align the head 110 within the cavity 803 such that the window 118 of the machine-readable symbol reader 101 faces out of the second aperture 815 at the front end 813 of the housing 801 to facilitate the capture or reading of machine-readable symbols by the machine-readable symbol reader 101. In some implementations, the one or more securing features 805 may position and orient the head 110 of the machine-readable symbol reader 801 within the cavity 803 such as to align a primary inductive charging interface 817 located proximate the major inside surface 807 with the secondary inductive charging interface 136 located at the top surface of the head 110 of the machine-readable symbol reader 101 to facilitate charging of the machine-readable symbol reader 101.

Figure 9:
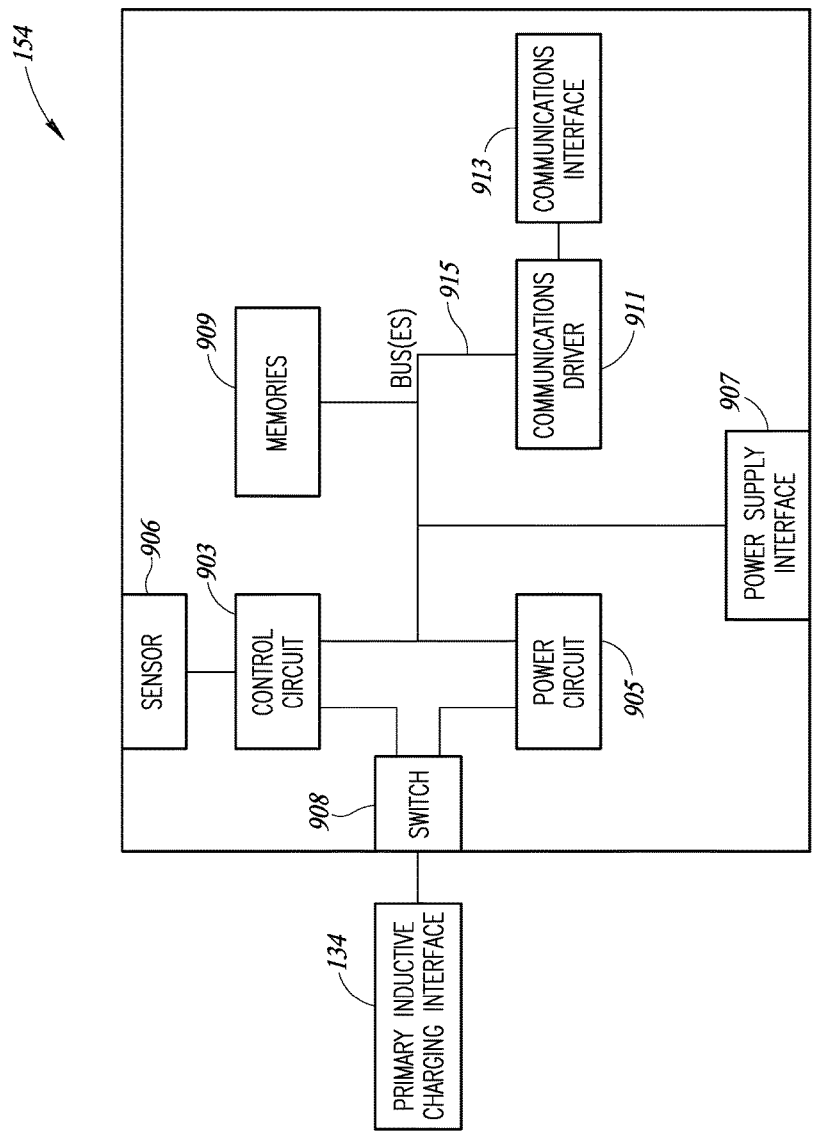
FIG. 9 is a block diagram of a controller circuitry, which may be used with or as part of a machine-readable symbol reader stand.

FIG. 9 provides a block diagram of a controller 154 for a stand 100, according to at least one illustrated implementation. The controller 154 includes at least a control circuit 903, a power circuit 905, a power supply interface 907, a sensor 906, and a switch 908. In some implementations, the controller 154 may also include one or more memories 909, a communications driver 911, and a communications interface 913. Each of these components may be communicatively connected by bus(es) 915, which can provide bidirectional communication between the various components of the controller 154. Bus(es) 915 may take, for example, the form of a plurality of buses (e.g., data buses, instruction buses, power buses) or a set of wires included in at least one body. In some implementations, the components of the controller 154 may be spread throughout the body of the stand 100. In some implementations, the components of the controller 154 may be located together, such as, for example, in the base 102.

The control circuit 903 may be any logic processing unit, such as a micro-controller, a central processing unit (CPUs), digital signal processors (DSPs), application-specific integrated circuits (ASICs), field programmable gate arrays (FPGAs), etc. The power circuit 905 may provide electrical power to the various components of the machine-readable symbol reader stand 100 by converting the power received from the power supply interface 907.

The sensor 906 may be any sensor used to detect whether the machine-readable symbol reader 101 is engaged within the cradle 106. Such a sensor may include, for example, an optical sensor (e.g., emitter-receiver pair), force sensor, load cell, or contact switch. The switch 908 may be any electrical switch that can be used to engage or disengage a power supply with a load. The switch 908 may be used to selectively electrically couple the power circuit 905 (or power supply interface 907) and the primary inductive charging interface 134 and to thereby control the operation of the primary inductive charging interface 134. The control circuit 903 may be electrically and communicatively coupled to the sensor 906 and to the switch 908. When the control circuit 903 receives a signal form the sensor 906 indicating that a machine-readable symbol reader 101 is engaged within the cradle 106, it may control the switch 908 to connect the power circuit 905 to the primary inductive charging interface 134, thereby causing the primary inductive charging interface 134 to become charged. When the control circuit 903 receives a signal form the sensor 906 indicating that the cradle 106 is empty, then the control circuit 903 may control the switch 908 to disconnect the primary inductive charging interface 134 from the power circuit 905.

In some implementations, the controller 154 may include one or more memories 909. The one or more memories 909 may include read-only memory ("ROM") and random access memory ("RAM"). In some implementations, the one or more memories 909 may comprise a flash drive or other solid state drive to store data and/or processor-executable instructions. In some implementations, the one or more memories 909 may include a hard disk drive for reading from and writing to a hard disk, an optical disk drive for reading from and writing to removable optical disks, and/or a magnetic disk drive for reading from and writing to magnetic disks. The one or more memories 909 may communicate with the control circuit 903 via the system bus 915. Those skilled in the relevant art will appreciate that other types of computer-readable media that can store data accessible by a computer may be employed, such as WORM drives, RAID drives, magnetic cassettes, flash memory cards, digital video disks ("DVD"), Bernoulli cartridges, RAMs, ROMs, smart cards, etc.

The controller 154 may include a communications driver 911 and a communications interface 913 that enable the machine-readable symbol reader stand 100 to communicate with one or more communications or data networks. The communications driver 911, for example, may include one or more wireless and/or wired communication stacks that enable the machine-readable symbol reader stand 100 to transmit data through a communications network via the communications interface 913. In some implementations, the communications driver 911 and communications interface 913 may enable the controller circuitry in the stand 100 to communicate with the machine-readable symbol reader 101. The communications interface 913 may include a wired communications port (e.g., a USB port, a game port, or other like port) and/or a wireless communications port (e.g., an antenna). Suitable communication protocols include FTP, HTTP, Web Services, SOAP with XML, WI-FI™ compliant, BLUETOOTH™ compliant, Near Field Communications (NFC) standards, cellular (e.g., GSM, CDMA), and the like. Suitable transportation protocols include TCP/IP, SCTP, DCCP, and the like.

The foregoing detailed description has set forth various implementations of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one implementation, the present subject matter may be implemented via Application Specific Integrated Circuits (ASICs). However, those skilled in the art will recognize that the implementations disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

Those of skill in the art will recognize that many of the methods or algorithms set out herein may employ additional acts, may omit some acts, and/or may execute acts in a different order than specified.

In addition, those skilled in the art will appreciate that the mechanisms taught herein are capable of being distributed as a program product in a variety of forms, and that an illustrative implementation applies equally regardless of the particular type of signal bearing media used to actually carry out the distribution. Examples of signal bearing media include, but are not limited to, the following: recordable type media such as floppy disks, hard disk drives, CD ROMs, digital tape, and computer memory.

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the disclosure.

The invention claimed is:

1. A stand to hold and charge machine-readable symbol readers with inductive charging interfaces, the stand comprising:
   a base;
   a cradle, the cradle comprising a housing having a front end, a back end, a cavity, a first aperture at the back end, and a second aperture at the front end, the cavity which extends through the housing from the first aperture at the back end of the housing toward the second aperture at the front end of the housing, the cavity sized and dimensioned to removably receive at least a portion of a head of a machine-readable symbol reader having a window, with the window of the machine-readable symbol reader facing and aligned with the second aperture of the cradle, the housing of the cradle includes a major inside surface that delineates a top of the cavity and the inductive charging interface of the stand is parallel and adjacent to the major inside surface and a minor inside surface that delineates a bottom of the cavity, and the major and the minor inside surfaces are spaced to removably secure the head of the machine-readable symbol reader in the cavity, the cradle further comprising: a first rotatable coupling joint that rotatably couples the major inside surface and the minor inside surface, wherein the first rotatable coupling joint has an axis of rotation that extends laterally across a width of the cavity, and a spring that applies a force to the major inside surface and the minor inside surface, the force to cause the major inside surface and the minor inside surface to rotate towards each other at the back end of the cavity to frictionally removably secure the head of the machine-readable symbol reader in the cavity;
   an inductive charging interface, the inductive interface located in the housing of the cradle, positioned to inductively couple with a complementary inductive charging interface of the machine-readable symbol reader when the head of the machine-readable symbol reader is securely positioned in the cradle; and
   a first arm having a first end and a second end, the first arm which extends at the first end thereof from the base, and the cradle that extends from the second end of the first arm.

2. The stand of claim 1 wherein the cavity of the cradle has a length, a width and a thickness, the length greater than the width and the width greater than the thickness, and the inductive charging interface of the stand predominately parallel to a plane defined by the length and the width of the cavity.

3. A stand to hold and charge machine-readable symbol readers with inductive charging interfaces, the stand comprising:
   a base;
   a cradle, the cradle comprising a housing having a front end, a back end, a cavity, a first aperture at the back end, and a second aperture at the front end, the cavity which extends through the housing from the first aperture at the back end of the housing toward the second aperture at the front end of the housing, the cavity sized and dimensioned to removably receive at least a portion of a head of a machine-readable symbol reader having a window, with the window of the machine-readable symbol reader facing and aligned with the second aperture of the cradle, the housing of the cradle further having a major inside surface that delineates a top of the cavity and the inductive charging interface of the stand is parallel and adjacent to the major inside surface and a minor inside surface that delineates a bottom of the cavity, and the major and the minor inside surfaces are spaced to removably secure the head of the machine-readable symbol reader in the cavity, the cradle further comprising a spring positioned on the minor inside surface, the spring to engage the head of the machine-readable symbol reader and provide a force to the head of the machine-readable symbol reader in a direction towards the major inside surface to frictionally removably secure the head of the machine-readable symbol reader in the cavity;
   an inductive charging interface, the inductive interface located in the housing of the cradle, positioned to inductively couple with a complementary inductive charging interface of the machine-readable symbol reader when the head of the machine-readable symbol reader is securely positioned in the cradle; and
   a first arm having a first end and a second end, the first arm which extends at the first end thereof from the base, and the cradle that extends from the second end of the first arm.

4. The stand of claim 1, wherein the cradle further comprises:
   a side wall, the side wall to physically couple the minor inside surface and the major inside surface in a spaced apart relation to form a tapered cavity that tapers from the front end of the cradle to the backend of the cradle, wherein the tapered cavity is sized and dimensioned to hold the head of the machine-readable symbol reader;
   a first rotatable coupling joint that rotatably couples the side wall to the second end of the first arm, wherein the first rotatable coupling joint has an axis of rotation that extends laterally across a width of the cradle; and
   a torsional spring that applies a force to the side wall in the direction towards the major inside surface and away from the minor inside surface.

5. The stand of claim 4, wherein the force applied by the torsional spring in the direction towards the major inside surface is less than an opposing force to be applied by a machine-readable symbol reader sized and dimensioned to be held in the tapered cavity, the opposing force to cause the side wall to rotate along the axis of rotation towards the minor inside surface to pivotally removably secure the head of the machine-readable symbol reader in the tapered cavity.

6. A stand to hold and charge machine-readable symbol readers with inductive charging interfaces, the stand comprising:

a base;

a cradle, the cradle comprising a housing having a front end, a back end, a cavity, a first aperture at the back end, and a second aperture at the front end, the cavity which extends through the housing from the first aperture at the back end of the housing toward the second aperture at the front end of the housing, the cavity sized and dimensioned to removably receive at least a portion of a head of a machine-readable symbol reader having a window, with the window of the machine-readable symbol reader facing and aligned with the second aperture of the cradle, and a first magnet located along the major inside surface, wherein the first magnet aligns with and securely, magnetically couples to a corresponding second magnet located along a top surface of the head of the machine-readable symbol reader.

7. The stand of claim 1 wherein the second aperture is a window.

8. The stand of claim 1 further comprising:

a second arm having a first end and a second end, the second arm which extends at the first end thereof from the base, and the cradle that extends from the second end of the second arm.

9. The stand of claim 8 wherein the first arm and the second arm are spaced apart across a width of the base, wherein at least a portion of the machine-readable symbol reader to suspend between the first support member and the second support member when the cradle has removably received at least a portion of the head of the machine-readable symbol reader.

10. The stand of claim 1 further comprising:

a first communications port that comprises a receiver and an antenna;

a processor communicatively coupled to the first communications port;

a second communications port that is communicatively coupled with the processor; and a nontransitory computer-readable medium communicatively coupled to the processor, wherein the nontransitory computer-readable medium stores processor-executable instructions that specifically program the processor to:

store electronic representations of data received by the first communications port from the machine-readable symbol reader; and transmit the electronic representations of data via the second communications port.

11. The stand of claim 10 wherein the second communications port further includes a power interface to receive power.

* * * * *